United States Patent [19]

Satoh

[11] Patent Number: 4,832,671
[45] Date of Patent: May 23, 1989

[54] BELT FOR A CONTINUOUSLY VARIABLE TRANSMISSION

[75] Inventor: Keiji Satoh, Tokyo, Japan

[73] Assignee: Fuji Jukogyo Kabushiki Kaisha, Tokyo, Japan

[21] Appl. No.: 154,687

[22] Filed: Feb. 10, 1988

[30] Foreign Application Priority Data

Feb. 18, 1987 [JP] Japan .................... 62-035104

[51] Int. Cl.$^4$ .............................................. F16G 1/22
[52] U.S. Cl. .................................... 474/242; 474/201
[58] Field of Search ............... 474/237, 240, 242, 244, 474/245, 201

[56] References Cited

U.S. PATENT DOCUMENTS 4,299,586 11/1981 van der Hardt Aberson ..... 474/242 X
4,338,081 7/1982 Hattori et al. .................. 474/201
4,427,401 1/1984 Hendriks et al. ............... 474/201
4,619,634 10/1986 Nakawaki ..................... 474/242 X

FOREIGN PATENT DOCUMENTS 53-42172 4/1978 Japan .

Primary Examiner—Thuy M. Bui
Attorney, Agent, or Firm—Martin A. Farber

[57] ABSTRACT

A belt has an endless laminated metal carrier and a plurality of metal elements engaged with the carrier. A residual stress is provided in the carrier such that sum of moments of the residual stress in the carrier becomes zero at a radius of an arc, at which lines indicating an outer surface maximum stress and an inner surface maximum stress of the carrier intersect each other. Namely both the stresses becomes small at the same time at the radius.

7 Claims, 3 Drawing Sheets

BELT FOR A CONTINUOUSLY VARIABLE TRANSMISSION

BACKGROUND OF THE INVENTION

The present invention relates to a belt for a belt drive device, and more particularly to a belt for a continuously variable belt-drive transmission for a motor vehicle.

A known continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency on driving conditions.

The belt comprises a pair of endless carriers and a plurality of metal elements adjacently arranged on the endless carriers, engaging opposed slits of each element with the carriers. Each carrier comprises a plurality of laminated metal strips.

The carriers are repeatedly bent and straightened as they pass around the pulleys and the straight running sides, so that stress is produced in the carriers. If the stress exceeds a fatigue limit, the belt may break down by repeated stress. Thus, the service life of the belt becomes short. Japanese Patent Laid Open No. 5342172 discloses an endless metal carrier which is preliminarily bent to provide a residual stress (internal stress) in the carrier so that a maximum stress which is produced in the carrier during the operation may be below the fatigue limit. Accordingly, strength against repeated bending and straightening is improved.

However, the residual stress given in the carriers is not always content. Accordingly, the maximum stress dependent on the residual stress may exceed the fatigue limit. Namely, the strength of the belt can not be sufficiently improved.

SUMMARY OF THE INVENTION

The object of the present invention is to provide an endless metal carrier for a belt of a continuously variable belt drive transmission wherein a maximum stress may be reduced, thereby extending the service life of the belt.

The other objects and features of this invention will become understood from the following description with reference to the accompanying drawings.

DETAILED DESCRIPTION OF THE PREFERRED EMBODIMENT

Figure 1:
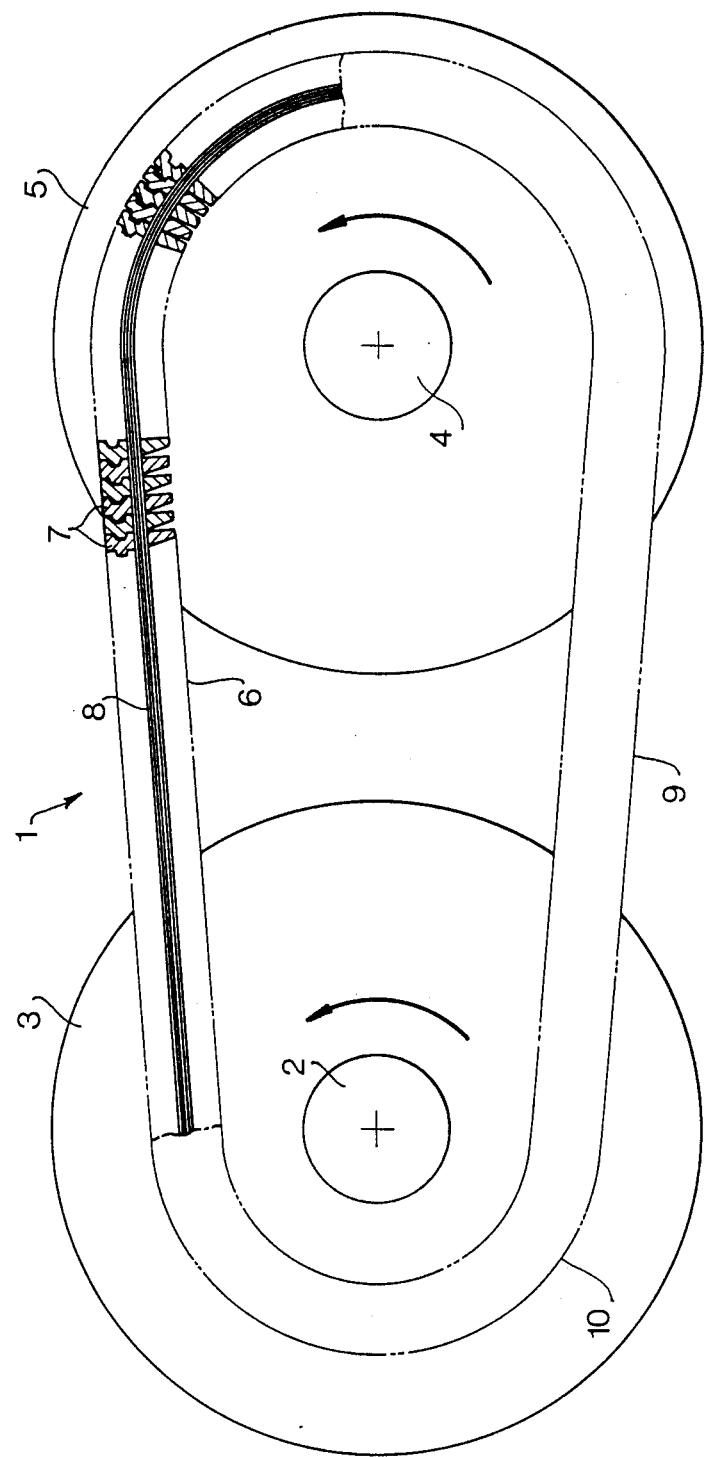
FIG. 1 is an elevational view of a belt device.
Figure 2:
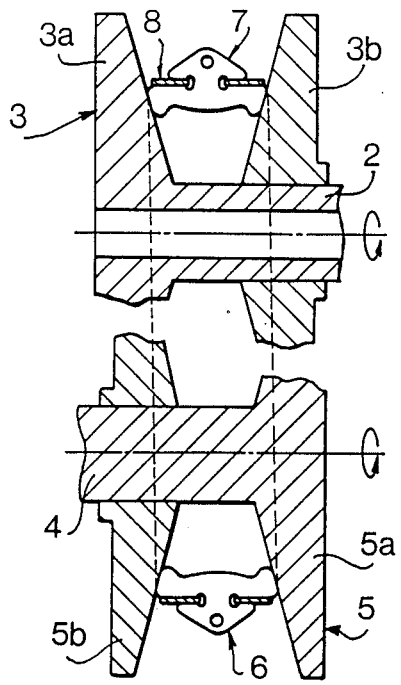
FIG. 2 is a schematic cross section of the belt device of FIG. 1.
Figure 3:
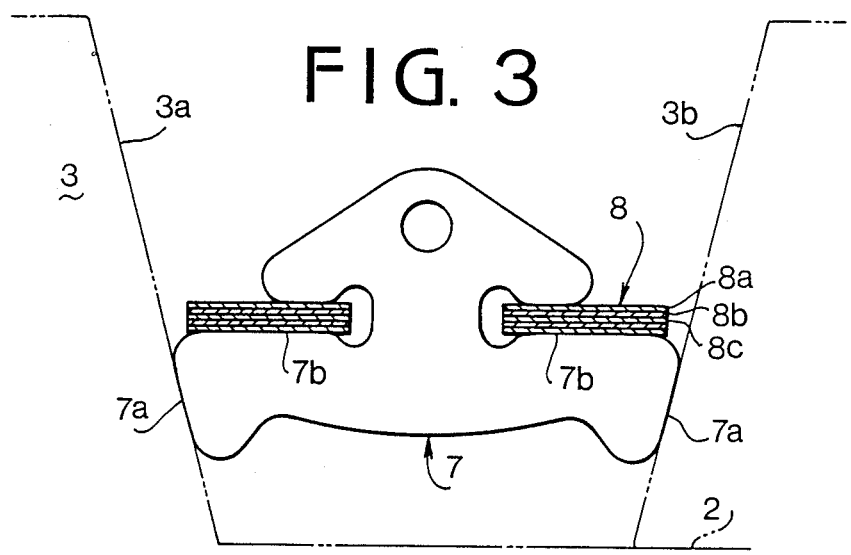
FIG. 3 is an elevational view of an element and carriers of a belt.

Referring to FIGS. 1 to 3, a belt-drive 1 to which the present invention is applied, has an input shaft 2 and an output shaft 4 provided in parallel with the input shaft 2. A drive pulley 3 and a driven pulley 5 are mounted on the shafts 2 and 4 respectively. A fixed conical disc 3a of the drive pulley 3 is integral with the input shaft 2 and an axially movable conical disc 3b is axially slidably mounted on the input shaft 2. A conical face of the fixed conical disc 3a confronts a conical face of the movable conical disc 3b thereby forming a groove therebetween.

A fixed conical disc 5a of the driven pulley 5 is formed on the output shaft 4 opposite a movable conical disc 5b. Conical faces of the respective discs 5a and 5b form a groove. A belt 6 engages the drive pulley 3 and the driven pulley 5.

The belt 6 comprises a pair of endless metal carriers 8 and a plurality of V-shaped metal elements 7 adjacently arranged along the carriers. Each element 7 has a pair of horizontal slits 7b at both sides wherein the metal carriers 8 are inserted.

The carrier 8 comprises laminated layers of flexible thin metal strips 8a, 8b, 8c . . . Each element 7 forms inclinations 7a at both sides of its lower portion so as to frictionally engage with the conical faces of discs 3a, 3b, 5a and 5b as shown in FIG. 3.

The engine power is transmitted from the input shaft 2 to the output shaft 4 through the drive pulley 3, belt 6 and driven pulley 5. As the movable conical discs 3b and 5b are axially moved along the shafts 2 and 4, the transmission ratio is continuously changed.

The belt 6 is repeatedly bent as it passes arcuate portions 10 along the pulleys and straightened at straight running sides 9 between the pulleys. The carriers 8 of the present invention are preliminarily bent to have a predetermined residual stress so as to be able to cope with such bending and straightening.

Figure 4:
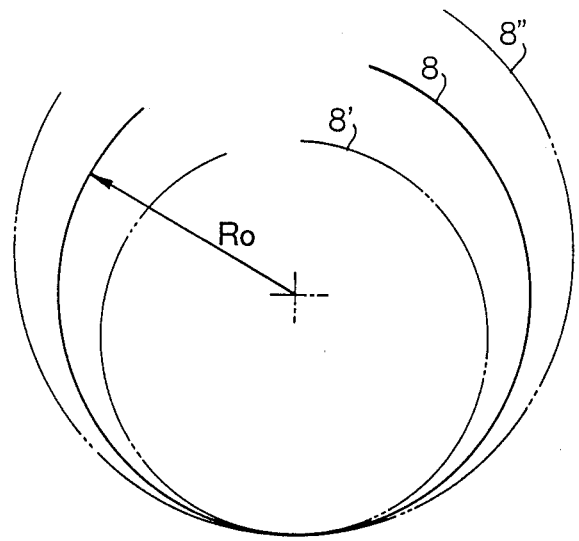
FIG. 4 is a diagram showing endless metal carriers in which residual stresses having different values are provided.

FIG. 4 shows carriers 8, each of which is cut at a portion. Each carrier forms an arc having a certain curvature where the sum of the moments of the residual stresses becomes zero. A radius $R_O$ of the arc varies as shown by chained lines 8' and 8" in dependency on the residual stress in the carrier 8.

Figure 5:
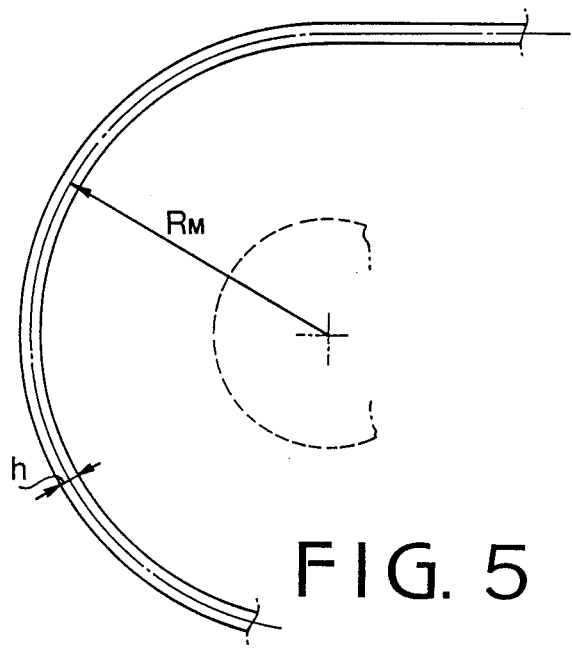
FIG. 5 is an enlarged view of a part of a belt and pulley device.

A maximum stress $\sigma$ inmax produced in inner surface of the carrier and a maximum stress $\sigma$ outmax produced in the outer surface of the carrier can be represented as follows:

$$\sigma\ \text{inmax} = E \times h/(2R_O - h) \quad (1)$$

$$\sigma\ \text{outmax} = E \times h \times (R_O - R_M)/2R_O \times R_M \quad (2)$$

wherein $R_M$ is a minimum pitch radius of the carrier 8 running over the pulleys as shown in FIG. 5, h is the thickness of the carrier 8 and E is Young's modulus.

Figure 6:
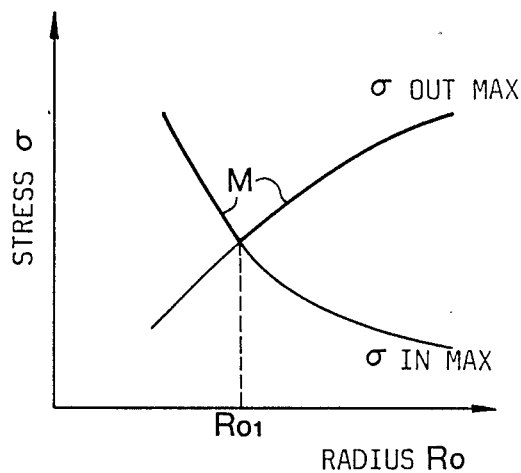
FIG. 6 is a graph showing a relationship between maximum stresses and radius of the arc of the carrier.

Since the thickness h and the minimum pitch radius $R_M$ are constant in a specific class of a belt drive transmission, the maximum stress $\sigma$ inmax and $\sigma$ outmax change dependent on the radius $R_0$ which is dependent on the residual stress. FIG. 6 shows a relationship between the radius $R_0$ and maximum stresses $\sigma$ inmax and $\sigma$ outmax obtained by the equations (1) and (2), respectively. A bold line M in the graph indicates maximum stress produced in the carrier 8 as a whole.

As shown in the graph, when the radius $R_O$ is small, the maximum stress $\sigma$ inmax of the inner surface of the carrier 8 increases at the straight running sides 9 in the course of the belt 6. When the radius $R_O$ is large, the maximum stress of the outer surface of the carrier 8 increases at the arcuate portions 10. During the running of the belt, when the maximum stress acting on the carrier 8 increases, the strength of the carrier against the repeated bending stress decreases. Thus, in the described instances, the carrier 8 cracks either from the inner surface or from the outer surface as a result of fatigue.

On the other hand, the maximum stress in the carrier 8 as a whole becomes minimum when the outer surface maximum stress $\sigma$ outmax and inner surface maximum stress $\sigma$ inmax are equal to each other at a radius Ro1. In accordance with the present invention, such a residual stress is provided in the carrier that the sum of moments of the residual stress in the carrier becomes zero at the radius (Ro1) where the lines indicating maximum stresses of the outer and inner surfaces intersect each other. Thus, the maximum stresses $\sigma$ outmax and $\sigma$ inmax can be reduced to a minimum value.

The residual stress can be provided in the carrier 8 by well known methods. For example, the endless metal carrier 8 is engaged with two tension rollers. A bending roller having a relatively small diameter is pressed against the carrier while it runs by the rotation of the tension rollers.

From the foregoing, it will be understood that the present invention provides a carrier for a belt wherein the carrier has an appropriate residual stress so that the carrier is not easily ruptured by fatigue either from the outer or inner surface of the carrier. Thus, service life of the belt can be extended.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a belt for a continuously variable transmission having an endless metal carrier and a plurality of metal elements engaged with the carrier, the improvement in the carrier wherein
   said endless metal carrier having a residual of stress such that an outer surface maximum stress of the carrier conincides with an inner surface maximum stress of the carrier, so as to provide a same radius at endless and open conditions of the carrier wherein the sum of moments of the residual stress therein become zero.

2. The belt according to claim 1 wherein the carrier comprises a laminated plates.

3. The belt according to claim 1 wherein the posture has an arcuate form.

4. The belt according to claim 1, wherein the carriers are formed of laminated layers of flexible thin metal strips.

5. The belt according to claim 1, wherein said carrier is bent to provide the residual stress.

6. In a belt for a continuously variable transmission having an endless metal carrier and a plurality of metal elements engaged with the carrier, the improvement in the carrier wherein
   said carrier having a predetermined residual stress, the predetermined residual stress being such that the sum of the moments of the residual stress in the carrier is zero at a posture whose an outer surface maximum stress and an inner surface maximum stress of the carrier conincide with each other.

7. The belt according to claim 6, wherein said carrier is bent to provide the residual stress.

* * * * *